3,062,077
Patented Nov. 6, 1962

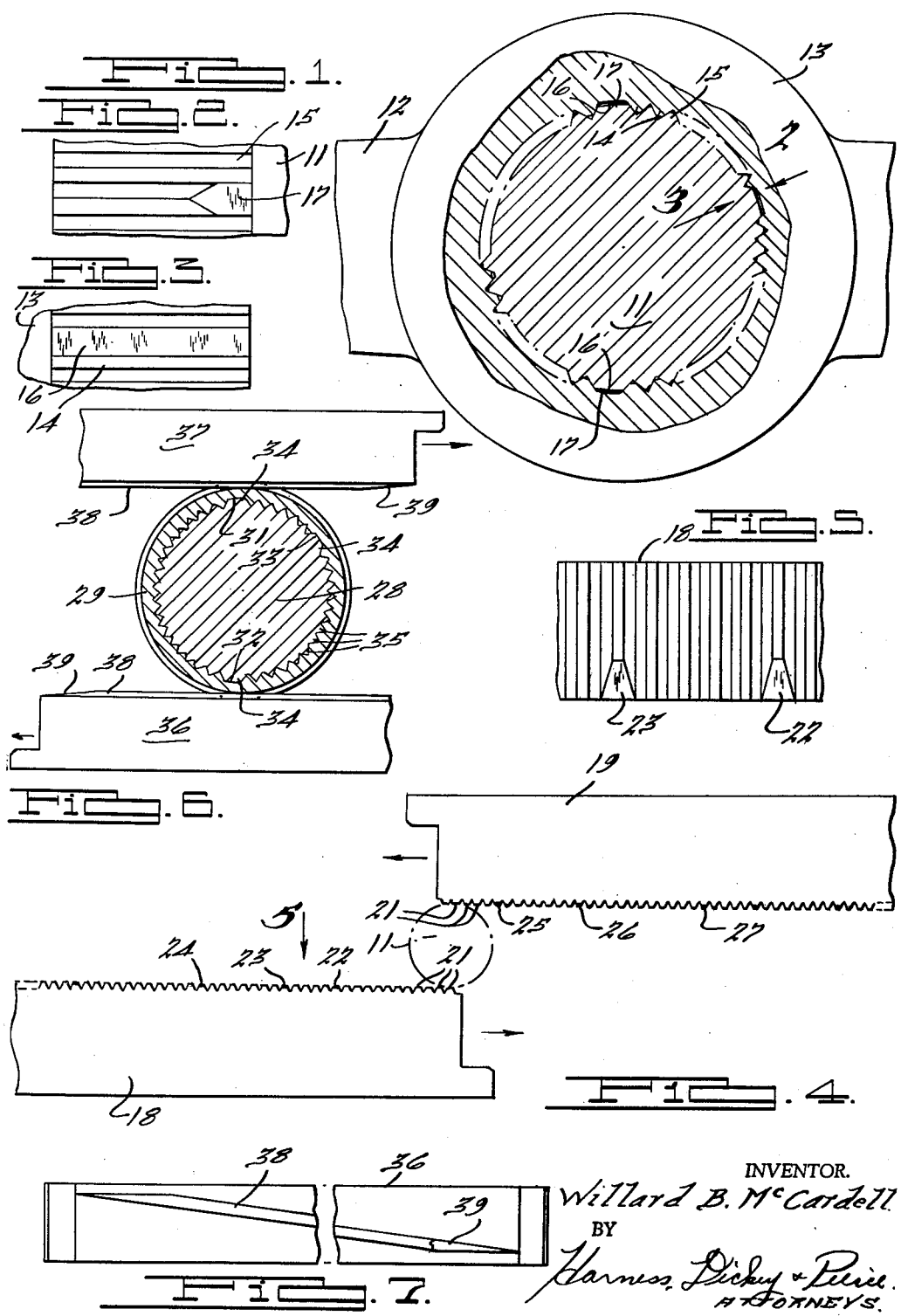

3,062,077
METHOD AND APPARATUS FOR EFFECTING A ONE-LOCATION ASSEMBLY
Willard B. McCardell, Royal Oak, Mich., assignor to Michigan Tool Company, Detroit, Mich., a corporation of Delaware
Filed Sept. 16, 1957, Ser. No. 684,218
1 Claim. (Cl. 80—20)

This invention relates to a method and apparatus for producing a one-location assembly, and more particularly to an arrangement which facilitates the manufacture of one-location assemblies at a high production rate.

There are many instances where it is desired that the assembly of one part to another be made with a specific angular relationship between the parts and that this relationship be the same for a large number of mass-produced assemblies. An example of such an arrangement is the assembly of a steering wheel on a steering shaft for an automotive vehicle. Modern steering wheel designs require not only that they be mounted on the steering shaft in a particular angular position but that the face of the steering wheel be oriented in a direction toward the passenger compartment. Under heretofore known methods of manufacture, the mass production of splines on steering shafts has made it difficult to achieve a true one-location assembly, since the labor and tooling costs required to produce such an assembly have been inordinately high. As an example, a known construction uses a 36 tooth tapered serration on the steering shaft produced by a 9 thread hob which enables the production of four missing serrations 90° apart. The steering wheel may be mounted on this shaft in any one of four positions 90° apart, the internal spline on the steering wheel hub being complementary to the shaft spline. This type of compromise solution to the problem of one-location assemblies is prevalent in many other instances where the economies of high production manufacturing methods outweigh the advantages of a true one-location assembly.

It is an object of the present invention to provide a method and apparatus by means of which a true one-location assembly may be produced while still retaining the advantages of high production and relatively low unit cost.

It is another object to provide an improved method and apparatus of the above nature which reduces or eliminates the need for finishing operations after a one-location spline has been produced on a shaft or bored part.

It is a further object to provide an improved method and apparatus of the above nature, which enables the production of an assembly in which the axial as well as the angular orientations will be predetermined, and in which the use of large and cumbersome tools is eliminated.

Other objects, features and advantages of the present invention will become apparent from the subsequent description, taken in conjunction with the accompanying drawings.

In the drawings:

FIGURE 1 is a view in elevation of one end of a steering shaft on which a steering wheel is mounted in one location using the arrangement of the invention, parts being sectioned for clarity;

FIGURE 2 is a fragmentary side elevational view of the external shaft spline, taken in the direction of the arrow 2 of FIGURE 1 and showing a filleted spline portion;

FIGURE 3 is a fragmentary side elevational view of the internal hub spline, taken in the direction of the arrow 3 of FIGURE 1 and showing the location of a gap in the spline teeth;

FIGURE 4 is a side elevational view of a pair of racks for producing a one-location spline on the steering shaft by the novel method of the invention;

FIGURE 5 is a top plan view of one of the racks of FIGURE 4 showing the positions of several tooth gaps for producing the spline fillets;

FIGURE 6 is a side elevational view, partly in cross section, of a modified form of the invention used for producing one-location internal splines on sleeves; and FIGURE 7 is a plan view of a forcing die used in the method of FIGURE 6.

The invention pertains to the production of a one-location assembly in such a manner that large numbers of such assemblies may be produced at relatively low cost without having to compromise on the number of ways in which the parts may be assembled. As an example of such an assembly and in order to illustrate the invention, a steering shaft 11 and a steering wheel 12 of an automotive vehicle are illustrated in FIGURE 1. Assume that it is desired to fixedly assemble wheel 12 to shaft 11 in a predetermined angular position and with one side of the wheel facing the passenger compartment. In order to accomplish this purpose, hub 13 of steering wheel 12 is provided with a plurality of internally projecting spline teeth 14 while shaft 11 has spline teeth 15 which interlock with spline teeth 14. Gaps 16 between adjacent spline teeth 14 on hub 13 are provided at three, irregularly spaced positions around the hub. Fillets 17 are provided between adjacent spline teeth 15 on shaft 11 at corresponding positions. As seen in FIGURE 2, the fillets may extend along only a portion of the spline length, although the entire length may be used if desired.

With this arrangement, as seen in FIGURE 1, hub 13 may be slipped onto shaft 11 at only one angular location, and it will be further noted that the hub may not be axially reversed on the shaft since the spaces and fillets would then be misaligned.

Should it be desired that the angular positioning of hub 13 be predetermined but that the axial orientation be with either side of the hub facing the adjacent shaft end, it will only be necessary to provide one space on hub 13 and one fillet on shaft 11. Two fillets and two spaces could also be provided to obtain a more uniform stress distribution. The tolerances on the internal and external spline teeth may, of course, be so selected as to obtain the desired fit.

FIGURE 4 illustrates a method of producing splines similar to those shown in FIGURE 1 on shaft 11. A pair of racks 18 and 19 are provided, these racks being movable tangentially to shaft 11 in opposite directions and engageable with opposite sides thereof so that shaft 11 rolls between the racks. This method of forming teeth on cylindrical workpieces is described in detail in application No. 461,178, filed October 8, 1954, by Joseph C. Drader, entitled "Machine," and comprises generally a process whereby metal is displaced by engagement with conjugate teeth on the tools having progressively increasing effective heights.

As seen in FIGURE 4, the teeth 21 on racks 18 and 19 which are closest to the leading ends of these racks have a lesser effective height than those toward the trailing end of the rack, so that workpiece 11 may be formed in a progressive manner as the racks advance in opposite directions. In the illustrated embodiment, the tops of teeth 21 slope upwardly toward the trailing end of the rack for this purpose, as seen best in FIGURE 4, although other methods of varying the effective height of teeth 21 may be utilized within the principles of the invention.

Assuming it is desired to form a spline on shaft 11 similar to that shown in FIGURE 1, having twenty-five teeth with three fillets spaced twelve, eight and five teeth apart, this may be done by appropriate removal of portions of the conjugate teeth on racks 18 and 19. More specifically, as shown in FIGURE 4, rack 18 has a partially removed tooth 22 spaced twelve teeth away from the leading tooth 21, and another partially removed tooth 23 spaced five teeth away from tooth 22. A third partially removed tooth 24 is shown as being spaced eight teeth from tooth 23, and additional partially removed teeth may be provided along the remaining length of rack 18 in a similarly staggered manner.

On rack 19, a partially removed tooth 25 is provided at a point spaced five teeth from the leading tooth 21 on this rack. A second partially removed tooth 26 is spaced eight teeth from tooth 25, and a third partially removed tooth 27 is spaced twelve teeth from tooth 26. The remainder of rack 19 has additional partially removed teeth in like fashion.

In this manner, it will be seen that when racks 18 and 19 are moved in the directions of the arrows in FIGURE 4, fillets 17 will be formed on shaft 11 by the action of the partially removed teeth on racks 18 and 19. In a similar manner, other fillet spacings may be fabricated by proper positioning of the partially removed teeth on the racks. Should it be desired to provide spaces instead of fillets on the shaft spline, the spaces or portions thereof between adjacent teeth 21 on racks 18 and 19 may be left filled so that corresponding spaces will be formed on part 11 as it is rolled between the racks. If it is desired to have only one fillet or only one space on the shaft spline, the discontinuities on the racks may be chosen accordingly. It is thus seen that a novel method and apparatus have been provided for mass-producing parts for one-location assemblies without having to compromise on the number of different positions in which the parts may be assembled.

In the example shown in FIGURE 1, hub 13 of steering wheel 12 could be fabricated by conventional broaching or other machining methods. In cases where the internally splined member is of cylindrical shape, the one-location internal spline may be fabricated by a method similar to that described in application Serial No. 643,440, filed March 1, 1957, by Willard B. McCardell, entitled "Method and Apparatus for Forming Internal Teeth on Tubular Elements," and assigned to the assignee of the present application. As seen in FIGURES 6 and 7, a rotatably mounted mandrel 28 is provided having an external spline complementary to the internal spline which is to be formed on a workpiece 29. Assuming it is desired to have three staggered spaces 31, 32 and 33 on the internal spline, fillets 34 are provided on mandrel 28 between appropriate teeth 35 thereof. A pair of forcing dies 36 and 37 movable tangentially in opposite directions with respect to workpiece 28 are provided, these dies having diagonal ridges 38 thereon as seen in FIGURE 7. The leading ends 39 of these ridges may be tapered as seen in FIGURE 6, and as dies 36 and 37 move past and rotate workpiece 29 they will force the material of the workpiece between the interstices of teeth 35 on mandrel 28. Ridges 38 will compress the workpiece material along helical bands extending around its circumference, the areas of compression at any one instant being insufficient to cause out-of-round deformation of workpiece 29. During this process the workpiece and mandrel will rotate due to the frictional forces exerted by the moving dies. As indicated above, the internal spline on workpiece 29 may be formed with any number and arrangement of discontinuities between the spline teeth.

While it will be apparent that the preferred embodiments of the invention disclosed are well calculated to fulfill the objects above stated, it will be appreciated that the invention is susceptible to modification, variation and change without departing from the proper scope or fair meaning of the subjoined claim.

What is claimed is:

In an apparatus for producing a one-location internal spline on a workpiece for axial assembly with a cylindrical workpiece, a rotatable mandrel having a plurality of teeth complementary to the teeth to be produced on said internal spline, a discontinuity between two teeth on said mandrel, a pair of forcing dies movable in a direction at right angles to said teeth whereby said teeth replace metal on the external workpiece surface tangentially in opposite directions with respect to a workpiece on said mandrel and rolling between said dies, and diagonal ridges on said forcing dies engageable with said workpiece during movement of the dies therealong, whereby helical bands on said workpiece will be progressively forced against said mandrel.

References Cited in the file of this patent

UNITED STATES PATENTS

| | | |
|---|---|---|
| 137,009 | Livingstone | Mar. 18, 1873 |
| 319,755 | Simonds | June 9, 1885 |
| 440,763 | Simonds | Nov. 18, 1890 |
| 446,934 | Simonds | Feb. 24, 1891 |
| 672,516 | Schinneller | Apr. 23, 1901 |
| 1,339,023 | Cole | May 4, 1920 |
| 1,446,447 | Bingham | Feb. 27, 1923 |
| 2,165,008 | Rosenberg | July 4, 1939 |
| 2,284,659 | Hosking | June 2, 1942 |
| 2,334,320 | Evans | Nov. 16, 1943 |
| 2,352,540 | Hanneman | June 27, 1944 |
| 2,375,481 | Lee et al. | May 8, 1945 |
| 2,443,688 | McFarland | June 22, 1948 |
| 2,565,623 | Parker | Aug. 28, 1951 |

FOREIGN PATENTS

| | | |
|---|---|---|
| 942,804 | Germany | May 9, 1956 |

UNITED STATES PATENT OFFICE
CERTIFICATE OF CORRECTION

Patent No. 3,062,077                        November 6, 1962

Willard B. McCardell

It is hereby certified that error appears in the above numbered patent requiring correction and that the said Letters Patent should read as corrected below.

Column 4, line 26, after "movable" insert -- transversely to said teeth and --; same column 4, lines 26 to 28, strike out "in a direction at right angles to said teeth whereby said teeth replace metal on the external workpiece surface --

Signed and sealed this 30th day of April 1963.

(SEAL)
Attest:

ERNEST W. SWIDER
Attesting Officer

DAVID L. LADD
Commissioner of Patents